United States Patent [19]

Muessel et al.

[11] 4,392,635

[45] Jul. 12, 1983

[54] ROTARY POWER COUPLING AND PLANETARY GEAR WINCH

[75] Inventors: Dan C. Muessel, Danvers; Nubar Hagopian, Boston, both of Mass.

[73] Assignee: Rule Industries, Inc., Gloucester, Mass.

[21] Appl. No.: 197,654

[22] Filed: Oct. 16, 1980

[51] Int. Cl.³ .................... B66D 1/22; F16D 3/04
[52] U.S. Cl. .................... 254/344; 464/105; 464/147; 464/902
[58] Field of Search .......... 64/31; 254/344, 297; 464/117, 136, 147, 150, 153, 154, 902, 104, 105

[56] References Cited

U.S. PATENT DOCUMENTS

| | | | |
|---|---|---|---|
| 1,133,312 | 3/1915 | Norris | 64/31 |
| 1,350,011 | 8/1920 | Du Bois | 64/31 |
| 2,080,296 | 5/1937 | Wood | 64/31 |
| 2,500,326 | 3/1950 | Shaff | 254/344 |
| 2,513,684 | 7/1950 | Shenk | 64/31 |
| 3,063,264 | 11/1962 | Forrest | 64/31 |
| 3,116,619 | 1/1964 | Spielbaur | 64/31 |
| 3,296,893 | 1/1967 | Shaffer et al. | 254/344 |

*Primary Examiner*—Billy S. Taylor

[57] ABSTRACT

Disclosed herein is a rotary power coupling comprising rotatable spaced-apart driving and driven members and a torque-transmitting coupling plate interposed therebetween. The coupling of the invention is of particular use in those applications wherein it is of value to isolate power train components and/or assemblies from certain operational strains imposed upon the power user. In a planetary gear winch assembly the coupling of the invention is located in the power train between the output of the final planetary gear speed reduction stage and the winch drum.

20 Claims, 4 Drawing Figures

ROTARY POWER COUPLING AND PLANETARY GEAR WINCH

BACKGROUND OF THE INVENTION

The present invention relates generally to a rotary power coupling for the delivery of rotational mechanical power therethrough and, more particularly, to a rotary coupling comprising means for accommodating certain operational strains imposed upon a power user without substantial reflection of such strains into components and/or assemblies of the power train residing upstream of the coupling. In another aspect, the invention comprises the combination of a planetary gear winch and the coupling of the invention.

Planetary gear winches, particularly those of a type usually employed in consort with boat trailers, recreational motor vehicles and the like, conventionally employ power trains comprising an electric motor prime mover coaxially coupled to a planetary gear train, the output of which gear train is, in turn, coaxially coupled to the winch drum. Thus, under no-load conditions, the principal axes of rotation of the several power train components of such winches are usually aligned along a common axis. The planetary gear train may comprise one or more planetary gear speed reduction stages, the gearing of each such stage comprising a central sun gear through which rotary power is delivered to two or more planet gears enmeshed by and surrounding said sun gear and a "reaction" gear surrounding and enmeshing said planetary gears.

Conventionally, the output of the final planetary gear speed reduction stage of the gear train is relatively rigidly coupled to the winch drum, such as by means of sturdy splined shafts or by use of the winch drum flange as the planet gear carrier of the final planetary gear speed reduction stage. While such relatively rigid coupling of the output of the planetary gear train to the winch drum is normally possessed of the benefits of simplicity and good manufacturing economics, it is nonetheless also possessed of certain serious operational deficiencies. Firstly, it is obvious that operational loads imposed upon the winch drum of such winches are reflected into the planetary gear trains thereof. Certain of such loads can tend to displace the axis of rotation of the winch drum and thereby render it eccentric with respect to the principal axis of rotation of the planetary gear train. Additionally, substantial skewing loads can also be imposed on the winch drum whereby the axis of rotation thereof is angularly displaced relative the the principal axis of rotation of the planetary gear train. In either instance, of course, those drum loads which disrupt the coaxial alignment of the axes of rotation of the drum and the planetary gear train can often result in the imposition of deleterious and even destructive unbalanced and/or racking loads upon the gearing of said gear problem has been vastly reduced.

It is a principal object of the present invention to provide a novel rotary power coupling.

It is another object of the invention to provide a rotary power coupling for coupling a source of rotary mechanical power to a power user, said source and said user having essentially common axes of rotation and which coupling can accommodate limited eccentric and/or angular displacements of the axis of rotation of said user relative to that of said source.

It is another object of the present invention to provide a novel planetary gear winch.

It is yet another object of the present invention to provide a planetary gear winch the planetary gear train of which is effectively isolated from deleterious unbalanced and/or racking loads originating by reason of certain operational loads imposed upon the winch drum.

Other objects and advantages of the present invention will in part be obvious and will in part appear hereinafter.

SUMMARY OF THE INVENTION

The coupling of the invention broadly comprises a rotatable driving member adapted for connection to a source of rotary power, a rotatable driven member adapted for connection to a rotary power user and a coupling plate interposed between said members. In the no-load condition the axes of rotation of said driving and driven members are essentially common. The driving member is rotatable on a plane normal to its axis of rotation and comprises a pair of flat, radial driving surfaces which lie on a diameter of said axis of rotation. The driven rotatable member is spaced axially from the driving rotatable member and is oriented parallel thereto, thereby to define a space therebetween. Said rotatable driven member comprises a pair of flat radial driven surfaces which lie on a diameter of its axis of rotation which is displaced by about 90° from that diameter defined by the driving surfaces of the driving member of the construction. A coupling plate resides in the space defined between the rotatable driving and driven members, said coupling plate comprising a pair each of driven and driving torque-transmitting surfaces corresponding to and in bearing relation with said driving and driven surfaces, respectively, of said rotatable driving and driven members. One or the other of the pair of driving surfaces of the driving member and the corresponding pair of torque-transmitting driven surfaces of the coupling plate and one or the other of the pair of driven surfaces of the driven member and the corresponding pair of torque-transmitting driving surfaces of the coupling plate extend centrally at least somewhat beyond the bearing surfaces in correspondence therewith, thereby to allow sliding eccentric displacement of the coupling plate relative to the axes of rotation of said driving and driven members. In a preferred embodiment of the invention the thickness of the coupling plate is at least somewhat less than the width of the space defined between the rotatable driving and driven members, thereby to allow said coupling plate to skew angularly relative to the axes of rotation of said driving and driven members.

The winch of the invention comprises a prime mover operatively connected to a planetary speed reduction gear train, the final gear speed reduction stage of which planetary gear train is coupled to a winch drum utilizing the coupling of the invention. The final speed reduction stage planet gear carrier can function as the rotatable driving member and a flange of the winch drum can function as the rotatable driven member of the coupling construction.

THE DRAWING

FIG. 1 hereof is a schematic, diagrammatic, perspective, partially sectional, exploded view of a rotary coupling in accordance with the invention and of a form suitable for use in a planetary gear winch of the invention.

FIG. 2 hereof is a schematic, diagrammatic, longitudinal and partially sectional view of a planetary gear winch of the invention comprising the rotary coupling of FIG. 1.

FIG. 3 hereof is a schematic, diagrammatic, sectional end view of the winch of FIG. 2 taken through lines 3—3' thereof.

FIG. 4 hereof is a schematic, diagrammatic, perspective, partially sectional, exploded view of another embodiment of the rotary coupling in accordance with the invention.

DESCRIPTION OF PREFERRED EMBODIMENTS

Figure 1:
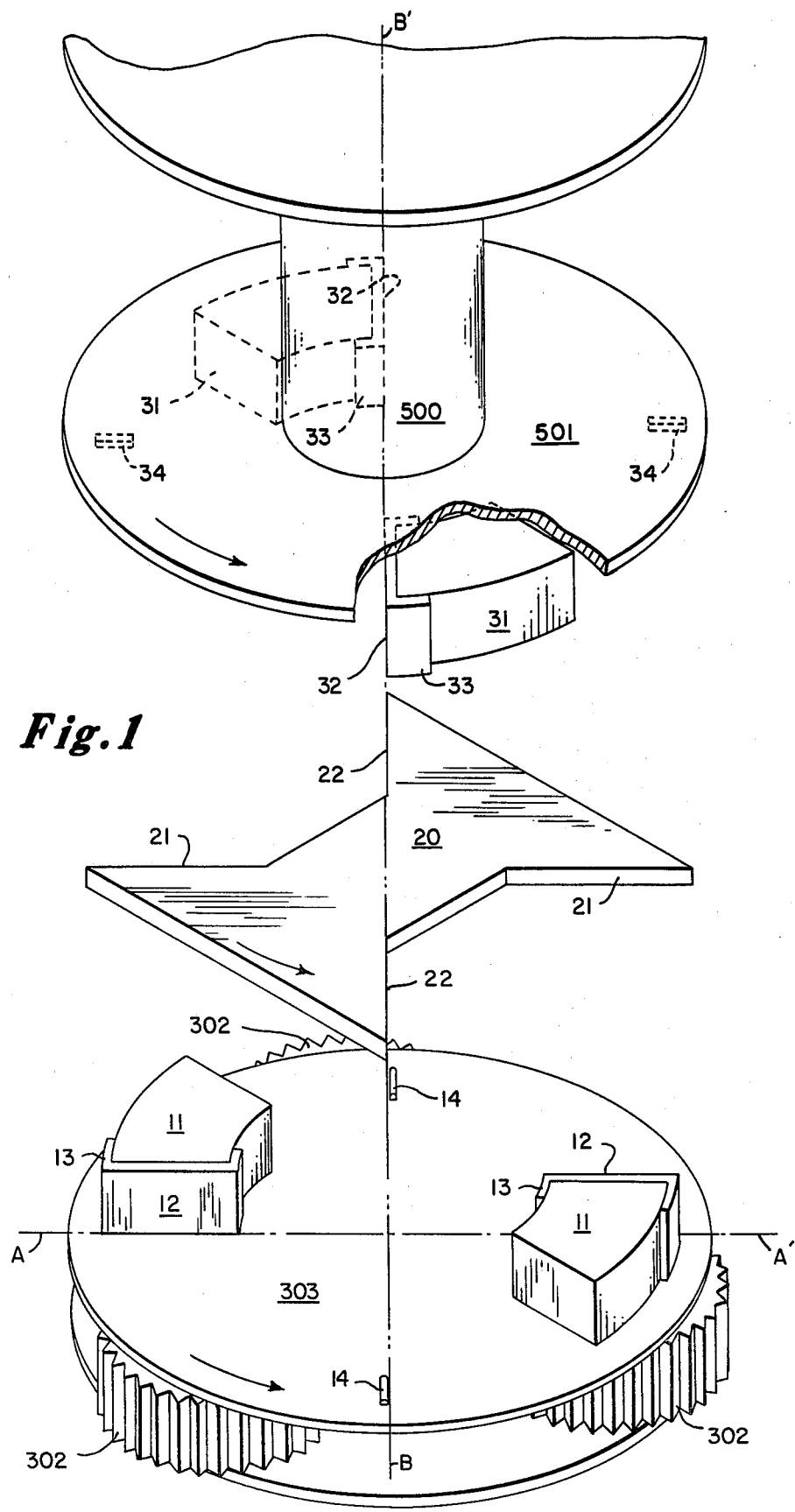
Figure 2:
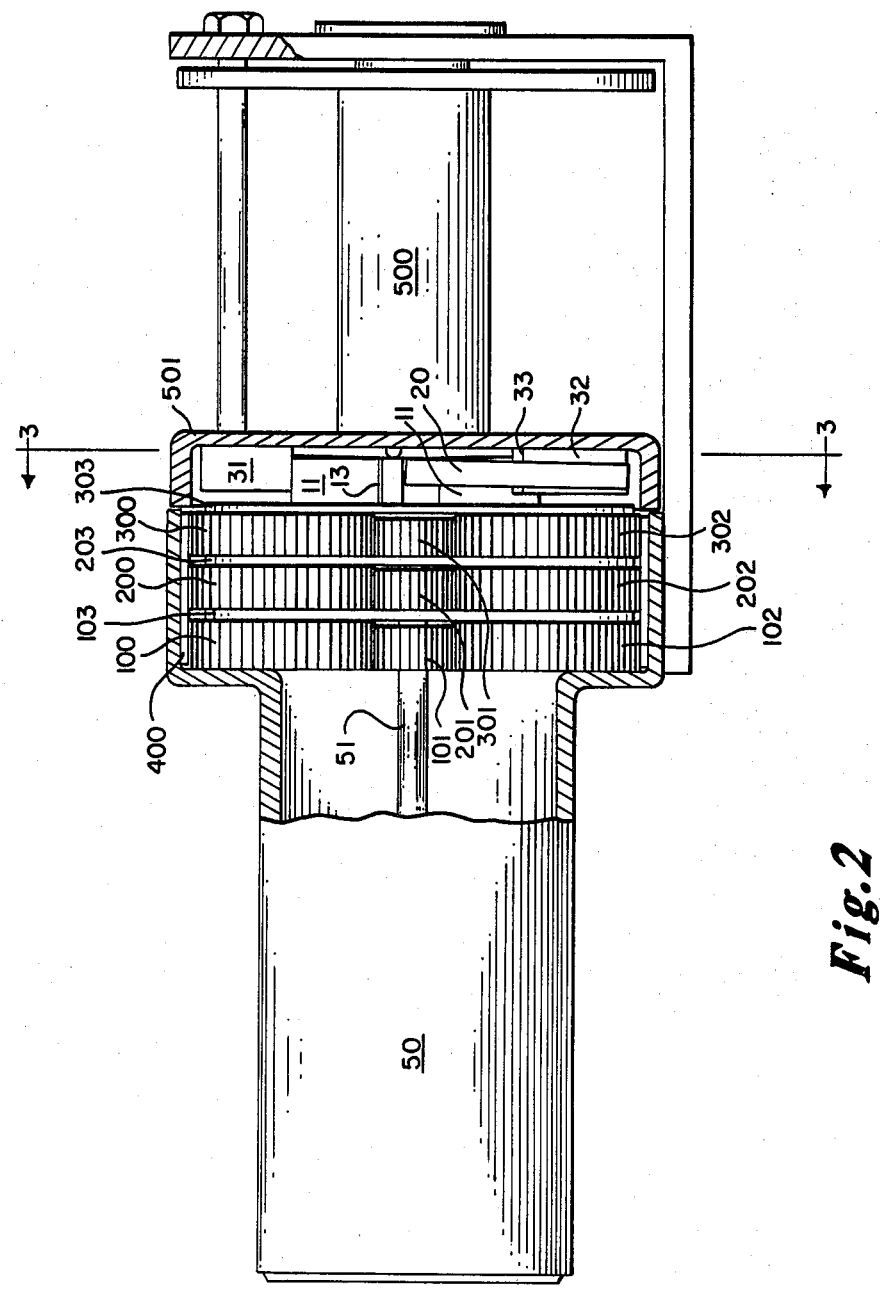
Figure 3:
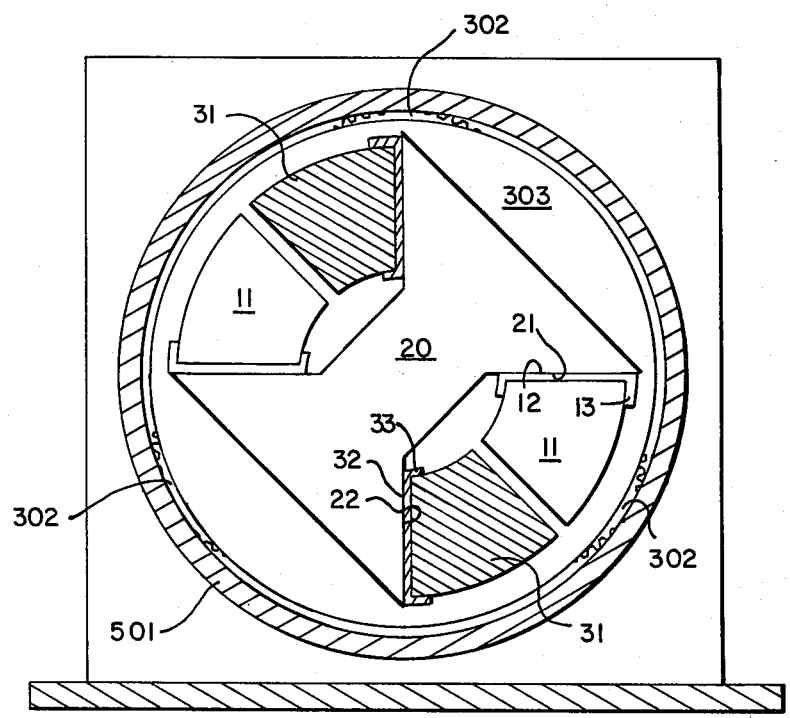

Referring now to FIGS. 1 through 3, wherein like reference numerals refer to like structures, the rotary coupling of the invention broadly comprises a rotatable driving member 303, oriented on a plane normal to the axis of rotation thereof, a rotatable driven member 501 spaced axially from and substantially parallel to said driving member 303 and a coupling plate 20 interposed therebetween.

In the embodiment of the invention shown in FIGS. 1 through 3 driving member 303 comprises a pair of bosses 11 rigidly affixed thereto or integrally formed therewith, said bosses 11 being shaped and located such as to define a pair of flat axially extending, radial driving surfaces 12 which, together, lie on a diameter of rotation A—A' of the rotatable driving member 303. In the interest of longevity of service life it is preferred that said driving surfaces 12 be composed of a hard and tough material. Thus, where bosses 11 are composed of a relatively soft and ductile material, such as aluminum, the desired hardness and toughness of said surfaces 12 can be provided by means of caps 13 formed of a hard tough metal such as steel and which caps 13 are affixed to the bosses 11 in any suitable manner.

Coupling plate 20 of FIGS. 1 through 3 hereof comprises a metallic plate suitably formed so as to define: (a) a pair of flat torque-transmitting driven surfaces 21 which correspond to and bear upon the driving surfaces 12 of rotatable driving member 303 and (b) a pair of flat torque transmitting driving surfaces 22 which correspond to and bear upon the driven surfaces 32 of rotatable driven member 501. In the assembled coupling of the invention, said driven torque-transmitting surfaces 21 lie on the diameter A—A' of the axis of rotation of rotatable driving member 303 and said driving torque transmitting surfaces 22 lie on the diameter B—B' of the axis of rotation of driven member 501, which diameter B—B' is displaced by 90° from the diameter A—A'. The coupling plate 20, of course, is fabricated from a tough, wear-resistant material such as steel and, as will be discussed in greater detail hereinafter, is preferably of at least somewhat lesser thickness than the width of the space between the spaced-apart rotatable driving and driven members 303 and 501.

Rotatable driven member 501 comprises a pair of bosses 31 rigidly affixed thereto or integrally formed therewith. Said bosses 31 are shaped and located such as to define a pair of flat, axially extending, radial driven surfaces 32 which, together, lie on the diameter B—B' of the axis of rotation of member 303 and which surfaces 32 are thereby adapted to correspond to and bear upon the driving torque-transmitting surfaces 22 of coupling plate 20. The thickness of said bosses 31, in other words, the distance to which they extend from the surface of the rotatable driven member 501, is substantially equal to that of bosses 11 of rotatable driving member 303, thereby to allow the bosses 11 and 31 of the assembled coupling to interleave. As previously pointed out in respect of the construction of the rotatable driving member 303, where bosses 31 are formed of a relatively soft material it is preferred that the driven flat radial surfaces 32 thereof be defined by hard and tough metallic caps 33 suitably affixed to said bosses 31.

An essential in the construction of the invention resides in the establishment of appropriate dimensional relationships between the torque-transmitting bearing surfaces of the coupling plate and the radial driving and driven surfaces, respectively, of the rotatable driving and driven members. Specifically, one or the other of the pairs of radial driving surfaces 12 and their corresponding torque-transmitting driven surfaces 21 and one or the other pairs of radial driven surfaces 32 and their corresponding torque-transmitting driving surfaces 22 extend centrally at least somewhat beyond the centralmost margins of the particular bearing surfaces in contact therewith. For example, as shown in the embodiment of FIGS. 1 through 3, the torque-transmitting driven surfaces 21 of coupling plate 20 extend centrally somewhat beyond the centralmost margin of the driving surfaces 12 and the torque-transmitting driving surfaces 22 extend centrally somewhat beyond the innermost margins of the driven surfaces 32. By this dimensional relationship the coupling plate 20 is provided with the ability to slide eccentrically on its bearing surfaces relative to the axes of rotation of rotatable driving member 303 and rotatable driven member 501. Thus, during operations, should the strain on the power use incorporating the coupling of the invention be such as to displace the axis of rotation of the driven member 501 eccentrically relative to that of the rotatable driving member 303, the coupling plate 20 will, in response to such strain, slide eccentrically on its torque-transmitting bearing surfaces 21 and 22 to maintain effective transmission of rotary power through the coupling while accommodating the strain imposed on the driven rotatable member 501. Thus, the extent to which the one bearing surface extends centrally beyond the other in the coupling construction of the invention is subject to considerable variation and will be dictated largely by the magnitude of the eccentric strains imposed on the driven rotatable member 501 during operations. This, of course, depends upon the particulars of the power user employed, its conditions of use and the manner in which the power user is mounted to its intended site of operations. In certain instances a dimensional relationship between the four torque-transmitting surfaces 21 and 22 of the coupling plate 20 and its corresponding driving and driven radial surfaces 12 and 32 such as to provide said plate with the ability to translate eccentrically to the extent of even only a few thousandths of an inch will be sufficient to obtain at least certain of the benefits of the invention.

In those applications wherein angular defection of the axis of rotation of rotatable driven member 501 can be experienced during operations, the thickness of coupling plate 20 relative to the width of the space between the facing surfaces of rotatable driving member 303 and rotatable driven member 501 is of consequence. Of primary importance, of course, the coupling plate 20 should be of sufficient thickness as to assure that torque-transmitting surfaces 21 and 22 can fully sustain the operational loads imposed thereupon. In addition, however, the thickness of coupling plate 20 will desirably be at least somewhat less than the width of the space defined between the facing surfaces of plate members 303 and 501. By adherence to this dimensional principle said coupling plate 20 is provided with the capability to skew in response to angular misalignment of the axis of rotation of rotatable driven member 501 relative to that of rotatable driving member 303, thereby isolating the driving member 303 (and those drive train components connected thereto) from deleterious loads which might otherwise be generated by such angular misalignment. Obviously, the minimum difference between the width of the space between the facing surfaces of members 303 and 501 and the thickness of coupling plate 20 is subject to considerable variation, a major factor being the extent of angular misalignment of the axes of rotation of members 303 and 501 to be expected during operations. With this knowledge in mind, however, it is obvious that one of skill can select an appropriate thickness of the coupling plate 20 and/or a suitable spacing between the facing surfaces of the rotatable driving and driven members 303 and 501 such as to afford the resulting coupling with sufficient angular "play" of the coupling plate 20 within said space. In certain instances, for instance, it will be found that the aforementioned angular misalignments to be expected during operations will not be great, say on the order of about 2°, or even less. Thus, the thickness of the coupling plate 20 under such circumstances need usually be but a few thousandths or hundredths of an inch less than the width of the space between the facing surfaces of members 303 and 501 in order to accommodate such misalignments.

In a preferred embodiment of the invention fulcra are provided between the coupling plate 20 and the corresponding facing surfaces of the rotatable driving member 303 and driven member 501 and upon which fulcra the coupling plate 20 can rock during operations. For example, in the particular embodiment of this invention shown in FIGS. 1 through 3 hereof, the surface of rotatable driving member 303 facing coupling plate 20 is provided with a pair of ridges 14 located substantially on that diameter of the axis of rotation thereof which is displaced by 90° from the diameter defined by the radial driving surfaces 12 of bosses 11. Similarly, the surface of rotatable driven member 501 facing coupling plate 20 is provided with a pair of ridges 34 located substantially on that diameter of the axis of rotation thereof which is displaced by 90° from the diameter defined by the radial driven surfaces 32 of bosses 30. By provision of these fulcra, the coupling plate 20 is urged to tilt, upon angular misalignment of the axes of rotation of the rotatable members 303 and 501, in such manner as to maintain the torque-transmitting driven and driving surfaces 22 and 21 thereof in flush bearing contact with the corresponding driving and driven radial surfaces 12 and 32. Thus, the provision of these fulcra serves to mitigate against belling or rounding of the edges of surfaces 12, 21, 22 and 32 and/or galling of these surfaces during operations.

Figure 4:
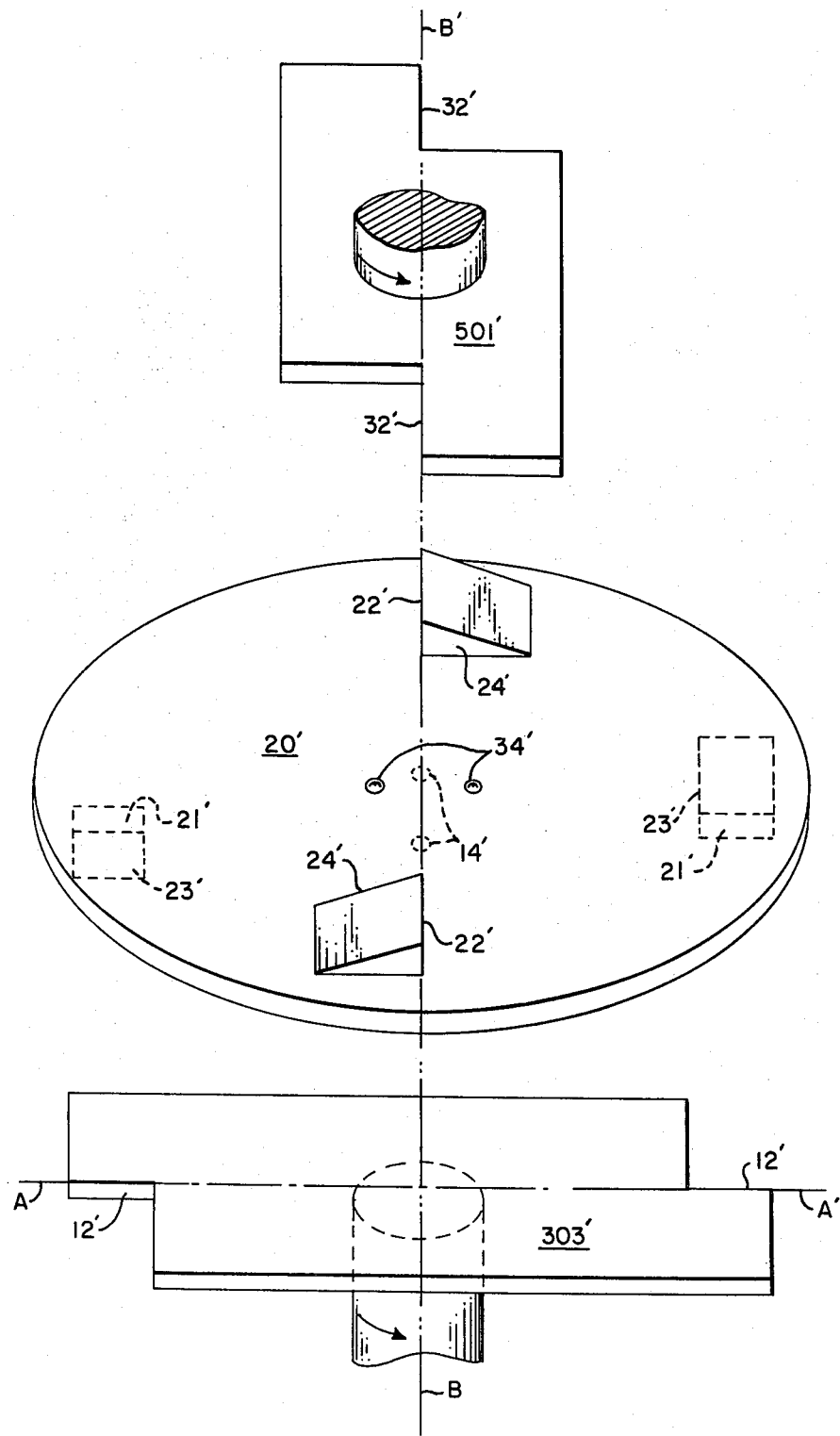

As will be appreciated by those of skill in the art, suitable fulcra can be provided which differ substantially in form and location from those of the embodiment of the invention specifically shown in FIGS. 1 through 3. For instance, said fulcra need not take the specific form of the ridges 34 of FIG. 1 but may, as shown in FIG. 4, comprise one or more protuberances 14' and 34' of any suitable geometry such as to define the fulcra for the coupling plate 20'. As is also shown in FIG. 4, it is obvious that the fulcra can be located on the coupling plate 20' rather than on the rotatable driving member and driven members 303' and 501'. In this case, of course, the fulcrum facing the driving member 303' will be positioned substantially on the diametral line defined by the torque-transmitting driving surfaces 22' while the fulcrum facing the driven member 501' will be positioned substantially on the diametral line defined by the torque-transmitting driven surfaces 21'.

As mentioned previously, the coupling of the invention has been found to be of particular value when employed as a component of a planetary gear winch, said coupling being located in the winch drive train between the final planetary gear speed reduction stage and the winch drum. In this embodiment of the invention referring again to FIGS. 1 through 3, the rotatable driving member 303 of the coupling may also conveniently serve as the planet gear carrier of a final planetary gear speed reduction stage 300. In the particular embodiment of FIG. 2 three planetary gear speed reduction stages, 100, 200, and 300, are shown. It is to be understood, however, that any number of planetary gear speed reduction stages, including one, may also be employed. A ring gear 400 is affixed coaxially in respect of the terminus of the output shaft 51 of a prime mover 50, said ring gear 400 meshing with the planet gears of each planetary gear speed reduction stage. A first sum or pinion gear 101 is affixed to the end of shaft 51, said sun gear 101 meshing with and driving planet gears 102 of the first planetary gear speed reduction stage 100. The planet gears 102 are journalled in a carrier 103 therefor and thus, by rotation of sun gear 101, the planet gears 102 are caused to orbit said sun gear and to rotate the planet gear carrier 103. Affixed to the center of said planet gear carrier 103 and extending downstream therefrom is sun or pinion gear 201 which meshes with and drives planet gears 202 of the second planetary gear speed reduction stage 200. Planet gears 202 are journalled in a carrier 203 therefor. Thus, the planet gears 202 are caused to orbit about sun gear 201, thereby causing rotation of the planet gear carrier 203. Affixed to the center of said planet gear carrier 203 and extending downstream therefrom is third stage sun or pinion gear 301 which meshes with and drives planet gears 302 of the third and final planetary gear speed reduction stage 300. Planet gears 302 are journalled to rotatable driving member 303 of the coupling of the invention, said plate member 303 thus also acting as the planet gear carrier for the final planetary gear speed reduction stage 300. One of the flanges of winch drums 500 defines the rotatable driven member 501 of the coupling of the invention. Accordingly, a suitable coupling plate 20, as previously described, is interposed between the final stage planet gear carrier/rotatable driving member 303 and said drum flange/rotatable driven member 501, thereby completing the winch construction of the invention.

During operations of a planetary gear winch various loads are imposed upon the drum 500 as functions of changing line loading and line position on the drum. Said loads can eccentrically and/or angularly disrupt the coaxial alignment of the axis of rotation of the drum with respect to that of the planetary gear train. Utilizing the coupling of the present invention, however, these disruptions are accommodated within the coupling structure and the imposition of deleterious racking loads upon the planetary gear train components is thereby avoided.

Obviously, many changes, modifications and alterations may be made in the above description without departing from the essential spirit and scope of the invention. For instance, the torque-transmitting surfaces of the coupling plate can be defined by bosses and the radial driving and driven surfaces of the rotatable driving and driven members can be defined by suitable notching of plate elements. Thus, referring now to FIG. 4 hereof, the rotatable driving and driven members 303' and 501' each comprise a flat plate element of generally rectangular configuration, which element is notched at opposing corners thereof so as to result in flat radial (relative to the axes of rotation of the members 303' and 501') driving and driven surfaces 12' and 32', respectively. The coupling plate 20', on the other hand, comprises a pair of bosses 23' extending from the surface facing rotatable driving member 303' and a pair of bosses 24' extending from the surface facing rotatable driven member 501', said bosses 23' and 24' being suitably positioned and so shaped as to define flat torque-transmitting surfaces 21' and 22' which ride on the driving and driven surfaces 12' and 32', respectively, in flush, bearing relationship therewith.

Accordingly, it is intended, and it should be so understood, that the foregoing description is to be regarded as illustrative of the principles of the invention, the cooperative relationships of the elements and of certain preferred embodiments thereof, and not in a limiting sense.

The embodiments of the invention in which an exclusive property or privilege is claimed are defined as follows:

1. A rotary mechanical coupling comprising:
a rotatable driving member adapted for connection to a sources of rotary mechanical power, said member being rotatable on a plane substantially normal to the axis of rotation of said source and comprising a pair of flat, radial driving surfaces lying on a diameter of said axis of rotation;
a rotatable driven member adapted for connection to a rotary power user, said driven member being spaced substantially coaxially from and substantially parallel to said driving member and comprising a pair of flat radial driven surfaces lying on a diameter of the axis of rotation thereof, said diameter being displaced by about 90° from the diameter defined by said driving surfaces of said driving member;
a coupling plate interposed between said driving and driven members, said coupling plate comprising a pair each of flat driven and driving surfaces corresponding to and in torque-transmitting, flush bearing contact with each of said pairs of flat radial driving and driven surfaces, respectively of said rotatable driving and driven members;
one or the other of the pair of flat radial driving surfaces of the driving member or the corresponding pair of flat driven surfaces of said coupling plate and one or the other of the pair of flat radial driven surfaces of said driven member or the corresponding pair of flat driving surfaces of said coupling plate each extending centrally at least somewhat beyond the bearing surface in flush contact therewith, thereby to allow sliding eccentric displacement of the coupling plate relative to the axes of rotation of said driving and driven members.

2. The coupling of claim 1 wherein each of said flat, flush bearing contact surfaces of said driving and driven members and said coupling plate is composed of a hard tough metallic material.

3. The coupling of claim 1 wherein said flat radial driving surfaces of said driving member are defined on a pair of bosses extending from the face thereof, wherein said flat radial driven surfaces of said driven member are defined on a pair of bosses extending from the face thereof and wherein said bosses are all of a substantially equal height and are of a shape such that the bosses of the driving member interleave with the bosses of the driven member.

4. The coupling of claim 3 wherein said bosses are each composed of a relatively soft malleable metallic material and wherein each of said flat radial driving and driven surface comprises a cap of relatively hard and tough metallic material affixed to its respective boss.

5. The coupling of claim 4 wherein said bosses are each composed of aluminum or an alloy thereof and wherein each said cap is composed of steel.

6. The coupling of claim 1 wherein the width of the space defined between said driving and driven members is at least somewhat greater than the thickness of said coupling plate, thereby to allow said coupling plate to skew angularly in response to angular displacement of said driven member relative to said driving member.

7. The coupling of claim 6 including fulcra between said coupling plate and the facing surfaces of said driving member and said driven member, the fulcrum residing between said coupling plate and said driving member being located on a diameter of the axis of rotation of said driving member about 90° displaced from the diameter defined by the pair of flat radial driving surfaces thereof and the fulcrum residing between said coupling plate and said driven member being located on a diameter of the axis of rotation of said driven member about 90° displaced from the diameter defined by the pair of flat radial driven surfaces thereof.

8. The coupling of claim 7 wherein said fulcra are each located on the facing surfaces of said driving and driven members.

9. The coupling of claim 7 wherein said fulcra are located on the surfaces of said coupling plate facing said driving and driven members.

10. The coupling of claim 7 wherein each fulcrum is defined by a pair of elongate radial ridges.

11. A planetary gear winch comprising
a prime mover,
a planetary gear train having at least one planetary gear speed reduction stage, said prime mover being coaxially connected to the rotary power input of said gear train,
a winch drum, and
a rotary mechanical coupling between said gear train and said winch drum, said coupling comprising:
  a rotatable driving member connected to the rotary power output of said gear train, said member being rotatable on a plane substantially normal to the axis of rotation of said output and comprising a pair of flat, radial driving surfaces lying on a diameter of said axis of rotation;
  a rotatable driven member connected to said winch drum, said driven member being spaced substantially coaxially from and substantially parallel to said driving member and comprising a pair of flat radial driven surfaces lying on a diameter of the axis of rotation thereof, said diameter being displaced by about 90° from the diameter defined by said driving surfaces of said driving member;

a coupling plate interposed between said driving and driven members, said coupling plate comprising a pair each of flat driven and driving surfaces corresponding to and in torque-transmitting, flush bearing contact with each of said pairs of flat radial driving and driven surfaces, respectively, of said rotatable driving and driven members;

one or the other of the pair of flat radial driving surfaces of the driving member or the corresponding pair of flat driven surfaces of said coupling plate and one or the other of the pair of flat radial driven surfaces of said driven member or the corresponding pair of flat driving surfaces of said coupling plate each extending centrally at least somewhat beyond the bearing surface in flush contact therewith, thereby to allow sliding eccentric displacement of the coupling plate relative to the axis of rotation of said driving and driven members and to thereby accommodate eccentric displacement of the axis of rotation of said winch drum relative to that of said rotary power output.

12. The winch of claim 11 wherein the width of the space defined between said driving and driven members is at least somewhat greater than the thickness of said coupling plate, thereby to allow said coupling plate to skew angularly in response to angular displacement of the axis of rotation of said winch drum relative to that of said rotary power output and to thereby accommodate such displacement.

13. The winch of claim 12 including fulcra between said coupling plate and the facing surfaces of said driving member and said driven member, the fulcrum residing between said coupling plate and said driving member being located on a diameter of the axis of rotation of said driving member about 90° displaced from the diameter defined by the pair of flat radial driving surfaces thereof and the fulcrum residing between said coupling plate and said driven member being located on a diameter of the axis of rotation of said driven member about 90° displaced from the diameter defined by the pair of flat radial driven surfaces thereof.

14. The coupling of claim 12 wherein said fulcra are each located on the facing surfaces of said driving and driven members.

15. The coupling of claim 12 wherein said fulcra are located on the surfaces of said coupling plate facing said driving and driven members.

16. The coupling of claim 12 wherein each fulcrum is defined by a pair of elongate radial ridges.

17. The winch of claim 11 wherein said driving member is the planet gear carrier of the final planetary gear speed reduction stage of said planetary gear train.

18. The winch of claim 11 wherein said driven member is a flange of said winch drum.

19. The winch of claim 11 wherein said flat radial driving surfaces of said driving member are defined on a pair of bosses extending from the face thereof, wherein said flat radial driven surfaces of said driven member are defined on a pair of bosses extending from the face thereof and wherein said bosses are all of a substantially equal height and are of a shape such that the bosses of the driving member interleave with the bosses of the driven member.

20. The winch of claim 11 wherein each of said radial flush bearing contact surfaces of said driving and driven members and said coupling plate is composed of a hard tough metallic material.

* * * * *